(12) United States Patent
Lin

(10) Patent No.: US 6,923,929 B2
(45) Date of Patent: Aug. 2, 2005

(54) METHOD AND APPARATUS FOR TREATING WASTE MATERIALS

(76) Inventor: Kang Chin Lin, No. 38, Alley 21, Lane 370, Teh Lun Road, Jen The Hsiang, Tainan Hsien (TW), 717

( * ) Notice: Subject to any disclaimer, the term of this patent is extended or adjusted under 35 U.S.C. 154(b) by 151 days.

(21) Appl. No.: 10/321,212

(22) Filed: Dec. 17, 2002

(65) Prior Publication Data

US 2004/0115374 A1 Jun. 17, 2004

(51) Int. Cl.[7] .................... B28B 3/10; B28B 11/08; B28B 11/10; B28B 23/00
(52) U.S. Cl. ................ 264/263; 264/268; 264/271.1; 264/279.1; 264/320; 264/333
(58) Field of Search .................. 264/263, 268, 264/271.1, 279.1, 320, 333

(56) References Cited

U.S. PATENT DOCUMENTS

| | | | | |
|---|---|---|---|---|
| 3,848,392 A | * | 11/1974 | Tezuka ................... | 53/413 |
| 4,164,537 A | * | 8/1979 | Drostholm et al. ....... | 264/333 |
| 5,021,205 A | * | 6/1991 | Niioka ................... | 264/69 |
| 5,169,566 A | * | 12/1992 | Stucky et al. ........... | 264/255 |
| 5,457,263 A | * | 10/1995 | Berglund ................ | 588/3 |
| 5,507,127 A | * | 4/1996 | Gates .................... | 52/605 |
| 5,624,620 A | * | 4/1997 | Turner ................... | 264/115 |
| 5,676,895 A | * | 10/1997 | Toivola et al. .......... | 264/112 |
| 5,746,037 A | * | 5/1998 | Nordberg ................ | 52/405.1 |
| 5,863,476 A | * | 1/1999 | Wier ..................... | 264/72 |
| 6,440,884 B1 | * | 8/2002 | Devagnanam ............. | 501/141 |

FOREIGN PATENT DOCUMENTS

JP      04-038351 A  *  2/1992  ............. E04C/1/40

OTHER PUBLICATIONS

English abstract of JP 04–038351 A, 1998, Japanese Patent Office website.*

* cited by examiner

Primary Examiner—Michael P. Colaianni
Assistant Examiner—Michael I. Poe
(74) Attorney, Agent, or Firm—Charles E. Baxley

(57) ABSTRACT

A method for manufacturing a waste block includes forming an outer housing by compressing soil material and engaging into and compressing a waste insert in the outer housing, for allowing the waste insert to be solidly and safely retained within the outer housing, and for preventing the waste insert from polluting the outer environment. The waste block may include one or more recesses or notches or juts or bulges for engaging with each other and for stably superposing a number of waste block together.

1 Claim, 5 Drawing Sheets

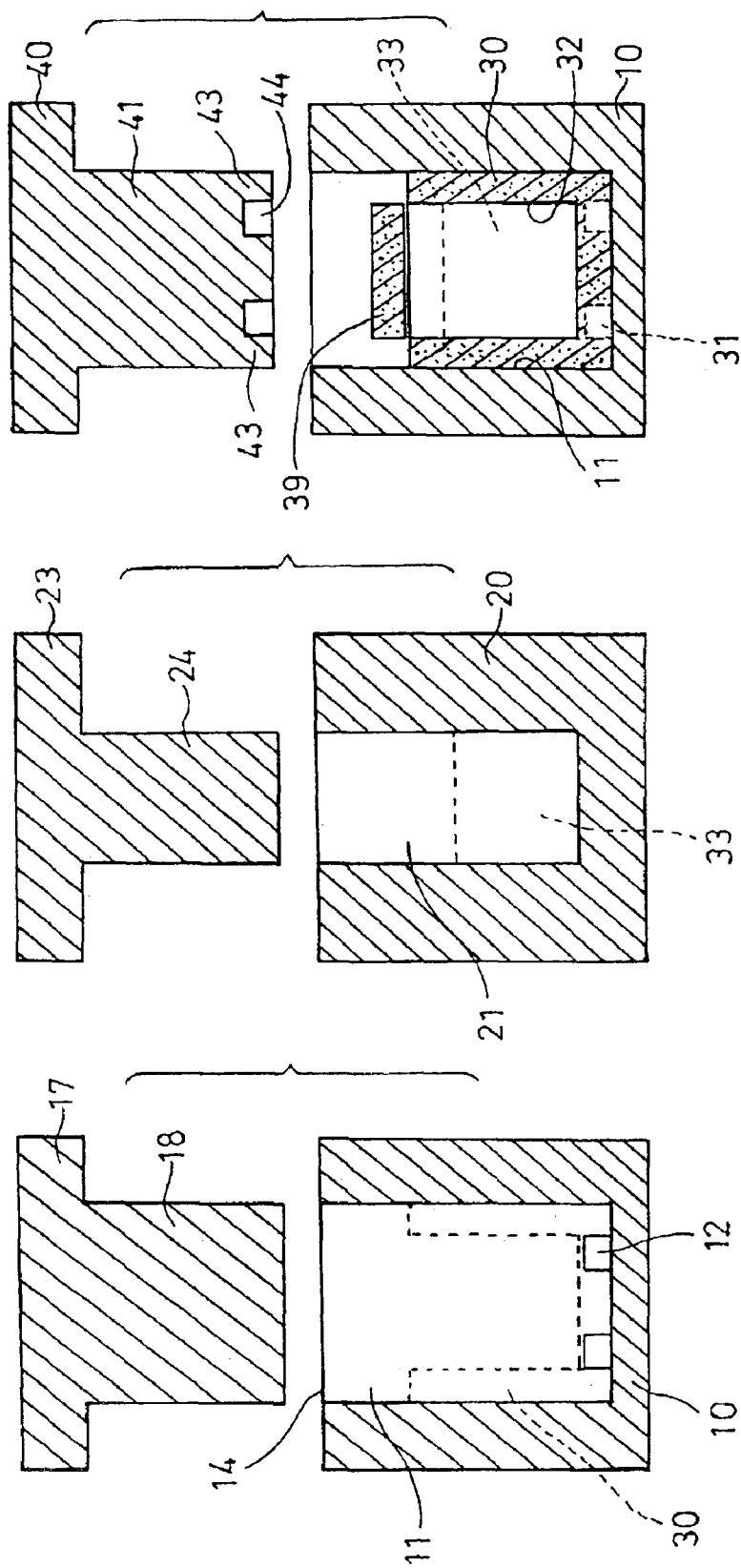

(CONTRACTING)

METHOD AND APPARATUS FOR TREATING WASTE MATERIALS

BACKGROUND OF THE INVENTION

1. Field of the Invention

The present invention relates to a waste materials treating method and processes, and more particularly to an apparatus for treating the waste materials.

2. Description of the Prior Art

Typically, the waste materials, particularly the toxic materials may be randomly and carelessly disposed everywhere, such as the garbage heap. Some of the waste or toxic materials may be buried in the ground without being treated, and thus may seriously pollute the environment.

The present invention has arisen to mitigate and/or obviate the afore-described disadvantages of the conventional waste materials treating methods.

SUMMARY OF THE INVENTION

The primary objective of the present invention is to provide a method and an apparatus for treating waste materials and for stabilizing the toxic materials in the waste materials.

The other objective of the present invention is to provide a method and an apparatus for treating waste materials with a harden agent to solidify and harden the waste materials by hammering or forging or compressing processes.

In accordance with one aspect of the invention, there is provided a waste block comprising an outer housing made of soil, and including a chamber formed therein, and a waste insert engaged into the chamber of the outer housing, and secured in the outer housing with compressing processes, for allowing the waste insert to be suitably and safely retained within the outer housing, and for preventing the waste insert from polluting the outer environment. The waste insert and the outer housing may be formed by hammering or forging processes, and may further be solidly secured together with further hammering or forging processes.

The outer housing includes a cover sheet engaged onto the waste insert for shielding and retaining the waste insert within the chamber of the outer housing.

The waste block includes a first side having at least one recess formed therein, and a second side having at least one jut formed thereon.

The waste block includes a first side having at least one notch formed therein, and a second side having at least one bulge formed thereon.

A casing is further provided and engaged between the outer housing and the waste insert for further stably retaining and shielding the waste material within the outer housing.

Further objectives and advantages of the present invention will become apparent from a careful reading of a detailed description provided hereinbelow, with appropriate reference to accompanying drawings.

BRIEF DESCRIPTION OF THE DRAWINGS

FIG. 4 is an exploded and cross sectional view illustrating a mold device for forming an outer housing of the waste block;

FIG. 5 is an exploded and cross sectional view illustrating another mold device for forming a waste insert of the waste block;

FIG. 6 is an exploded and cross sectional view illustrating the mold device for forming the waste block with the outer housing and the waste insert;

DETAILED DESCRIPTION OF THE PREFERRED EMBODIMENT

Figure 1:
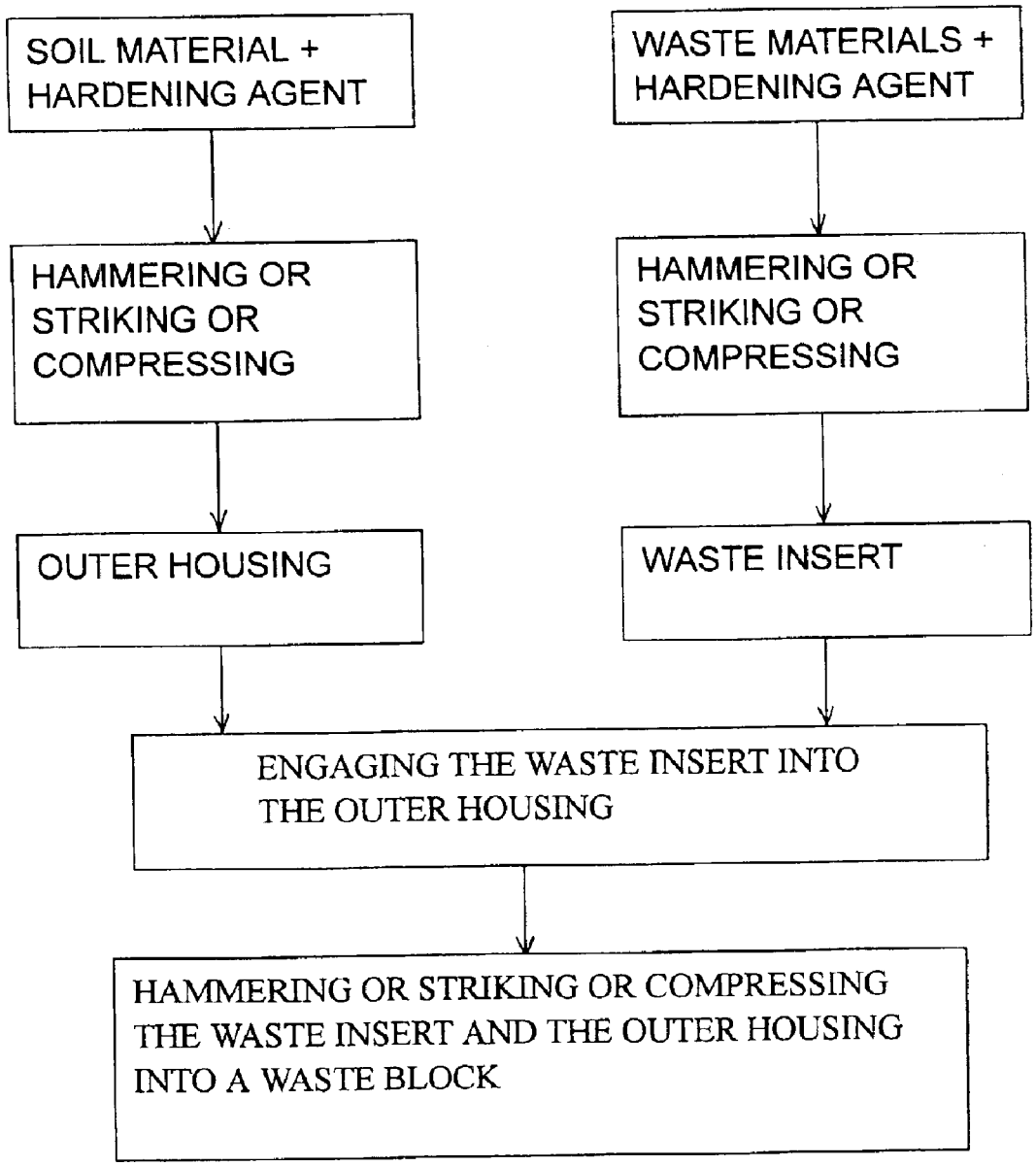
FIG. 1 is a block diagram illustrating a method in accordance with the present invention for treating the waste materials.

Referring to the drawings, and initially to FIG. 1, illustrated is a method in accordance with the present invention for treating waste materials, such as toxic materials, trash, garbage, dirt, and the like.

Figure 2:
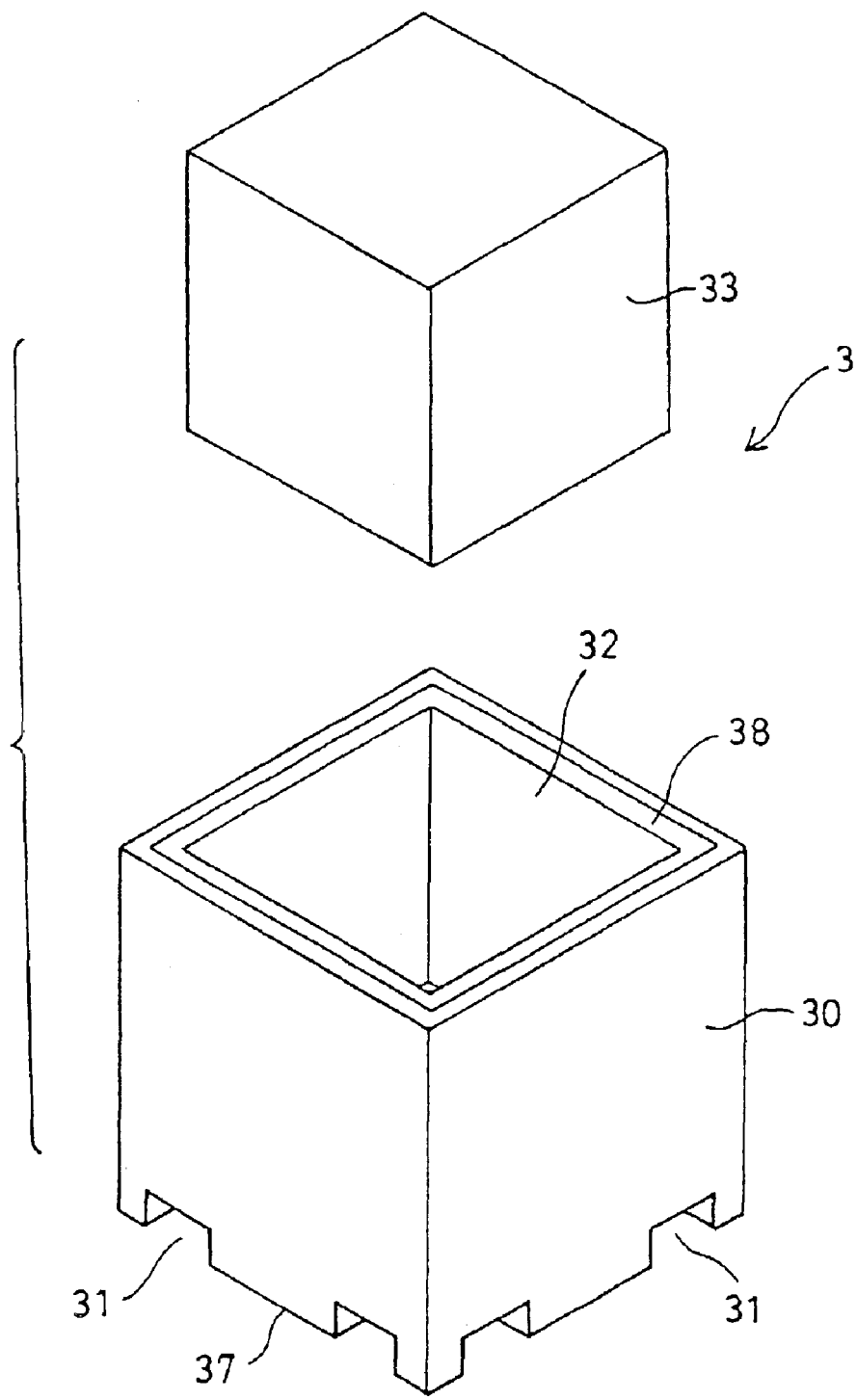
FIG. 2 is an exploded view of a waste block to be made or produced with the method in accordance with the present invention.
Figure 3:
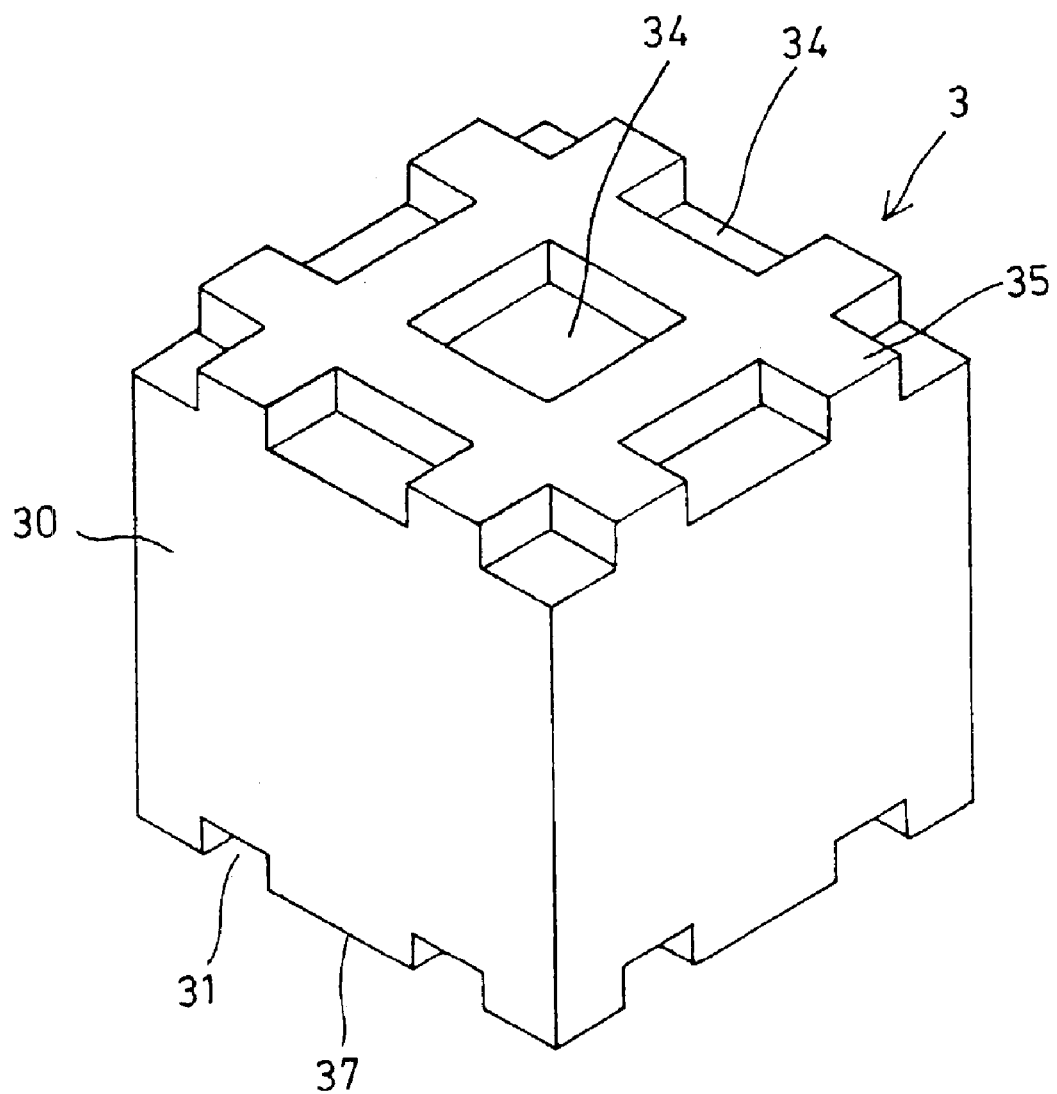
FIG. 3 is a perspective view of the waste block.

As shown in FIGS. 2 and 3, an outer housing 30 will be made or formed with the soil, such the typical or normal soil. A hardening agent is then included or added into the soil to form a mixed soil material, and includes about one to four times, by weight or by volume, of that of the soil.

The mixed soil material is then subjected with a hammering or striking or compressing process. For example, as shown in FIG. 4, the mixed soil material is disposed in a mold cavity 11 of a mold device 10 which has an opening 14 formed in the upper portion thereof for receiving the mixed soil material.

A mold piece 17 is provided above the mold device 10 and is forced and moved toward and away from the mold device 10 and the mixed soil material in a reciprocating action, for hammering or compressing the mixed soil material to form the outer housing 30, with a high pressure ranging from 300 to 600 kg/cm$^2$, and for forming the outer housing 30 having a great hardness.

The mold device 10 may include one or more swellings 12 extended into the chamber 11 thereof (FIG. 4) for forming one or more corresponding notches 31 and/or one or more juts 37 in one side of the outer housing 30. The mold piece 17 may include a hammering piece 18 extended therefrom for engaging into the mixed soil material, and for forming a cavity 32 in the outer housing 30.

While the mixed soil material is hammered or compressed by the mold piece 17 and/or the mold device 10, a heat reaction may be occurred or generated, and a temperature more than 200° F. may be generated in the hammered or compressed outer housing 30. The soil material may be solidly adhered or bonded together by the great heat or temperature, in order to form the outer housing 30 having a further increased hardness.

As shown in FIG. 2, a waste insert 33 will be formed with the waste materials, such as the toxic materials, the trash, the garbage, the dirt, and the like. The hardening agent or the other hardening agent is then included or added into the waste material to form a mixed waste material, and includes about one half to four times, by weight or by volume, of that of the waste material.

The mixed waste material is then subjected with a hammering or striking or compressing process. For example, as shown in FIG. 5, the mixed waste material is disposed in a mold cavity 21 of another mold device 20 which is provided for receiving the mixed waste material.

Another mold piece 23 is provided above the mold device 20 and is forced and moved toward and away from the mold device 20 and the mixed waste material in a reciprocating action, for hammering or compressing the mixed waste material to form the waste insert 33, with a high pressure ranging from 300 to 600 kg/cm$_2$, and for forming the waste insert 33 also having a great hardness.

The mold piece 23 may include another hammering piece 24 extended therefrom for engaging onto the mixed waste material, and for forming or shaping the flat outer appearance of the waste insert 33.

While the mixed waste material is hammered or compressed by the mold piece 23 and/or the mold device 20, a heat reaction may be occurred or generated, and a temperature more than 200° F. may be generated in the hammered or compressed waste insert 33. The waste material may further be solidly adhered or bonded together by the great heat or temperature, in order to form the waste insert 33 having a further increased hardness.

The hardening agent may include the following materials: $SiO_2$ 23.0% by weight, CaO 60.0% by weight, $Al_2O_3$ 5.0% by weight, $Fe_2O_3$ 2.0% by weight, $SO_3$ 2.2% by weight, and MgO 2.0% by weight, and the other materials, such as the inorganic chemical materials 4.5% to 5.8% by weight.

The ratio of the $SiO_2$ relative to the $Al_2O_3$ and the $Fe_2O_3$ is 23/(5.0+2.0)=3.3. The ratio of the $Al_2O_3$ relative to the $Fe_2O_3$ is 5.0/2.0=2.5. The ratio of the CaO relative to the $SiO_2$ and the $Al_2O_3$ and the $Fe_2O_3$ is 60.0/(23+5.0+2.0)=2.0. The hardening agent includes no toxic materials therein.

When mixed soil material and/or the mixed waste material is subjected to the reciprocating and hammering or compressing process, the soil material or the waste material may be solidly bonded together to form the greatly hardened outer housing and/or waste insert. The soil material or the waste material may further be solidly bonded together to form the greatly hardened outer housing and/or waste insert by the great heat.

As shown in FIG. 6, the outer housing 30 may be engaged into or retained in the mold cavity 11 of the mold device 10, and the waste insert 33 may then be disposed or engaged into the cavity 32 of the outer housing 30.

Another mold piece 40 may then be provided above the mold device 10 and is forced and moved toward and away from the mold device 10 in a reciprocating action, for hammering or compressing the outer housing 30 and the waste insert 33, for solidly securing the outer housing 30 and the waste insert 33 together to a waste block 3 as shown in FIG. 3.

The mold piece 40 may include a further hammering piece 41 extended therefrom for engaging onto the outer housing 30 and the waste insert 33, and for forming or shaping the outer appearance of the waste block 3 as shown in FIG. 3. The hammering piece 41 may include one or more projections 43 and/or depressions 44 provided therein for forming or for shaping one or more corresponding recesses 34 and/or bulges 35 on the side of the waste block 3 (FIG. 3) that opposite to the side of the recesses 31 and the juts 37 of the waste block 3.

It is preferable that a cover sheet 39 is further provided and engaged onto the waste insert 33, for forming a complete outer housing 30 and for suitably or completely refining or receiving the waste insert 33 within the outer housing 30 and/or the cover sheet 39, and for preventing the waste insert 33 from being exposed. The cover sheet 39 is preferably made of the soil or similar materials that form the outer housing 30.

Figure 7:
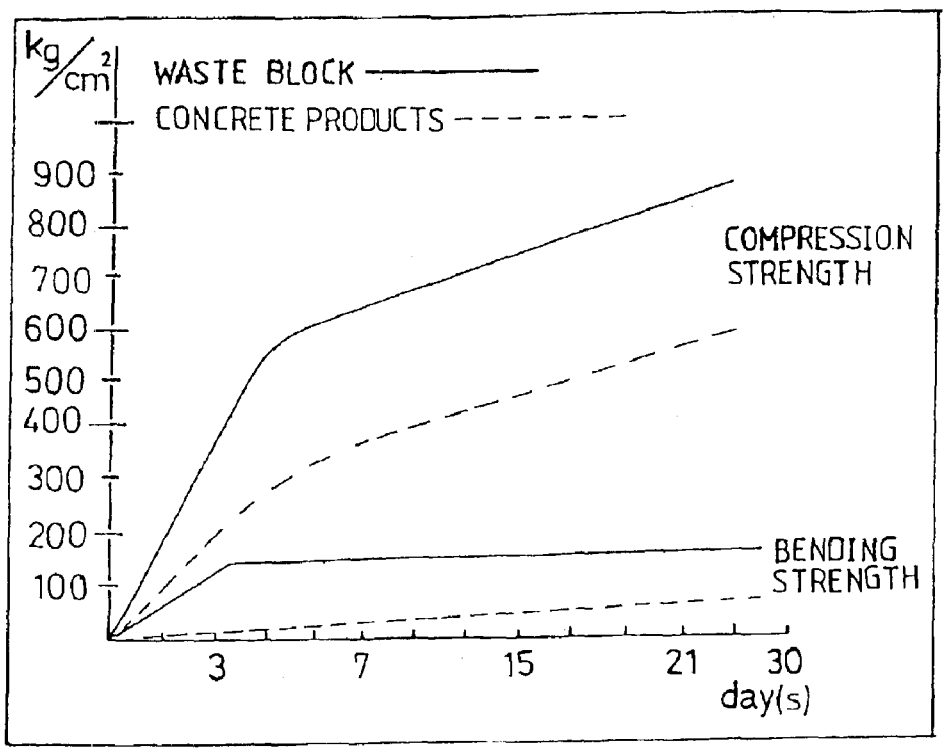
FIG. 7 is a chart illustrating the compressive strengths and the bending strengths of the waste block and the conventional concrete products.
Figure 8:
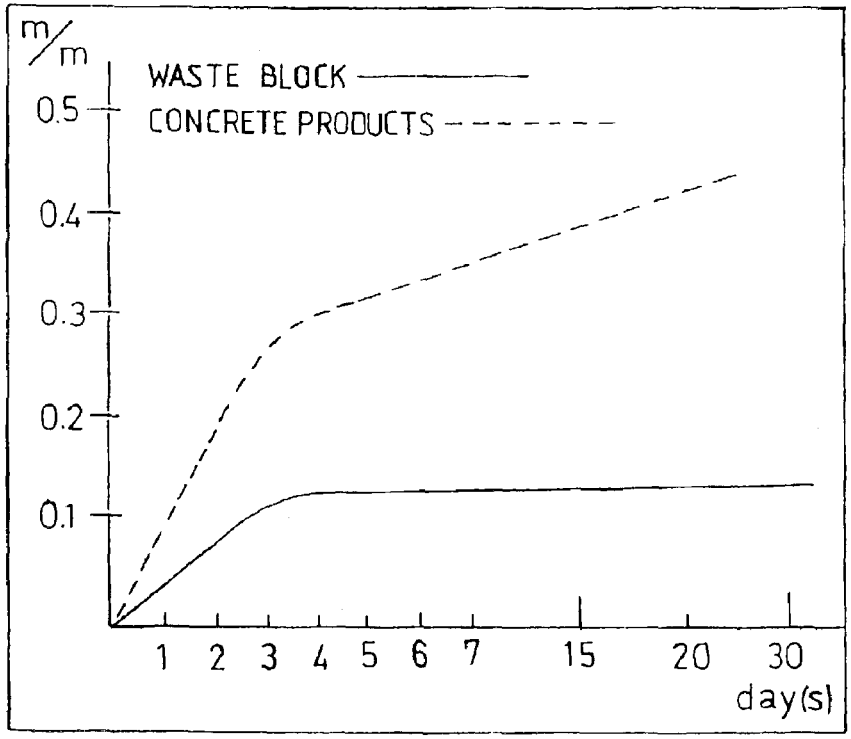
FIG. 8 is a chart illustrating the contractions of the waste block and the conventional concrete products.

Referring next to FIGS. 7 and 8, the compression strength of the waste block 3 may reach 700 kg/cm$^2$ and above, and the bending strength of the waste block 3 may reach about 150 kg/cm$^2$, and the contraction of the waste block 3 may be maintained in about 0.1 m/m. The water permeability of the waste block 3 may be maintained in or below about $1.0 \neq 10^{-10}$ cm/sec.

As shown in FIG. 7, the compression strength of the typical concrete materials or products may reach only from about 210–450 kg/cm$^2$, and is greatly smaller than 700 kg/cm$^2$ of the waste block 3. The bending strength of the typical concrete materials or products may reach only about 50 kg/cm$^2$, which is also greatly smaller than 150 kg/cm$^2$ of the waste block 3.

It is to be noted that the waste materials, such as the toxic waste materials may be suitably contained and retained in the hard outer housing 30, and may further be hammered or compressed within the outer housing 30, such that the toxic waste material may be stably and solidly retained within the outer housing 30 and will not flow out of the outer housing 30, and such that the environment will not be polluted by the waste materials.

In addition, the waste block 3 is formed by high pressure hammering or compressing processes, and thus may resist acid, alkali, corrosion, temperature, heat, contraction, and may resist striking. A lead casing 38 (FIG. 2) may further be provided and engaged between the outer housing 30 and the waste block 3 for shielding the other waste materials.

The waste block 3 may be formed or shaped into different volumes, such as 0.5 m$^3$, 0.8 m$^3$, 1.0 m$^3$, 1.5 m$^3$, 2.0 m$^3$, 2.5 m$^3$, ... etc., according to the places to receive or to store the waste block 3. In addition, the juts 37 and the bulges 35 of the outer housing 30 or of the waste blocks 3 may be engaged into the recesses 34 and the notches 31 of the other waste blocks 3, for allowing the waste blocks 3 to be stably superposed with each other and to be prevented from moving relative to each other.

The waste blocks 3 may use the waste materials, and thus may include a greatly reduced cost, and may be used for constructing the roads, dikes, dams, bridges, sea shore or wall construction units, etc., which may thus be manufactured with greatly decreased cost.

Accordingly, the waste material treating process in accordance with the present invention is provided for treating waste materials and for stabilizing the toxic materials in the waste materials, and may treat the waste materials with a harden agent to solidify and harden the waste materials by hammering or forging or compressing processes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A method for manufacturing a waste block, said method comprising:

introducing and mixing a hardening agent with a soil material, compressing the hardening agent and the soil material into an outer housing having a chamber formed therein, introducing and mixing a hardening agent with a waste material, compressing the hardining agent and the waste material into a waste insert, engaging the waste insert into the chamber of the outer housing, engaging a casing between the waste insert and the housing, compressing the outer housing and the waste insert together to retain the waste insert into the chamber of the outer housing, forming the hardening agent and the soil material into a cover sheet, engaging the cover sheet onto the waste insert for shielding the waste insert in the outer housing, and forming the waste block, forming at least one notch and at least one jut in one side of the waste block, and forming at least one recess and at least one bulge in other side of the waste block, opposite to the at least one notch and the at least one jut of the waste block, for engaging with each other and for stably superposing waste together.

* * * * *